(12) United States Patent
Chung et al.

(10) Patent No.: US 7,533,857 B2
(45) Date of Patent: May 19, 2009

(54) HEIGHT-ADJUSTABLE APPARATUS

(75) Inventors: Chia-Shen Chung, Banqiao (TW);
Chihg-Wen Chao, Taichung (TW);
Sheng-Yao Hsiao, Guanyin Township, Taoyuan County (TW)

(73) Assignee: Qisda Corporation, Taoyuan County (TW)

( * ) Notice: Subject to any disclaimer, the term of this patent is extended or adjusted under 35 U.S.C. 154(b) by 288 days.

(21) Appl. No.: 11/288,300

(22) Filed: Nov. 29, 2005

(65) Prior Publication Data
US 2006/0113440 A1 Jun. 1, 2006

(30) Foreign Application Priority Data
Nov. 29, 2004 (TW) .............................. 93136723 A

(51) Int. Cl.
*F16M 11/24* (2006.01)
(52) U.S. Cl. .................. 248/188.2; 248/188.8; 248/649
(58) Field of Classification Search ................ 248/649, 248/650, 188.2, 188.3, 188.4, 188.8, 188.5, 248/408, 409, 677; 353/69, 70, 119; 182/201, 182/204
See application file for complete search history.

(56) References Cited

U.S. PATENT DOCUMENTS

| | | | | |
|---|---|---|---|---|
| 6,461,002 B1 * | 10/2002 | Su | ............................ | 353/119 |
| 6,523,799 B2 * | 2/2003 | Su | ............................ | 248/404 |
| 6,719,431 B2 * | 4/2004 | Liu et al. | ...................... | 353/70 |
| 6,796,538 B2 * | 9/2004 | Hsu et al. | ................ | 248/188.2 |
| 6,871,826 B2 * | 3/2005 | Oyama et al. | ............ | 248/188.8 |
| 6,921,173 B2 * | 7/2005 | Lee | .............................. | 353/69 |
| 7,111,948 B2 * | 9/2006 | Lee et al. | .................... | 353/119 |
| 7,178,768 B2 * | 2/2007 | Inoue | ...................... | 248/188.4 |

* cited by examiner

*Primary Examiner*—Gwendolyn Baxter

(57) ABSTRACT

A height-adjustable apparatus, including a chassis, an actuation unit, an adjustment unit, and an elastic unit, is disclosed. The chassis has a positioning unit and an opening. The actuation unit, movably disposed on the chassis, had a first hole and a first engagement part. The first hole accommodates the positioning unit. The adjustment unit passes through the opening and is movably disposed on the chassis. The adjustment unit has a plurality of second engagement parts. The elastic unit is disposed in the first hole and between the positioning unit and the actuation unit. When the actuation unit is actuated, the first engagement part disengages with the second engagement part to allow movement of adjustment unit. When the actuation unit is non-actuated, the elastic unit forces the first engagement part to engage with a selected second engagement part to lock the adjustment unit.

19 Claims, 5 Drawing Sheets

HEIGHT-ADJUSTABLE APPARATUS

CROSS REFERENCE TO RELATED APPLICATIONS

This application claims priority of Taiwan Patent Application Ser. No. 093136723 entitled "Height-Adjustable Apparatus", filed on Nov. 29, 2004.

FIELD OF THE INVENTION

The present invention relates to a height-adjustable apparatus, particularly to a height-adjustable projector.

BACKGROUND OF THE INVENTION

As the technology of consumer electronics is developed over times, multimedia becomes a basic requirement in many application fields. The video output device is one of multimedia equipments. There are various types of video output device in the market, such as LCD projector, CRT projector, slide projector, video player, etc. The operation of projector is usually restricted by its surrounding environment, such as distance and projecting angle between screen and projector, height of platform supporting the projector, flatness of the platform, etc. Therefore, the height of projector is preferably adjustable to comply with the restrain of environment. Several prior art height adjustment mechanisms are provided to address this problem.

FIG. 1 is a schematic view of a projector 100 with prior art adjustment apparatus. The adjustment mechanism of projector 100 includes a base 110, a rack 104, and a bolt 114. The base 110 stands on the platform 102 to support the weight of projector 100. The height of projector is adjusted by rotating the base 108. However, the friction between the base 110 and the platform 102 makes it difficult to rotate the base 108. Moreover, the adjustment process is time consuming and in-efficient.

Some other adjustment mechanisms are disclosed along with other problems, such as mechanical complexity, assembly difficulty, etc. Moreover, the trend of consumer electronics tends to provide slimmer and lighter products, which require smaller components and better arrangement inside the apparatus.

As described above, it is advantageous to provide a height-adjustable apparatus with simple mechanism and small size to allow the user easily adjusting the height of the apparatus.

SUMMARY OF THE INVENTION

The present invention discloses a height-adjustable apparatus, including a chassis, an actuation unit, an adjustment unit, and an elastic unit. The chassis has a positioning unit and an opening. The actuation unit is movably disposed on the chassis. The actuation unit has a first hole, a second hole, and a first engagement part. The first hole accommodates the positioning unit and the second hole accommodates the adjustment unit. The adjustment unit is movably disposed on the chassis and passes through the opening and the second hole. The adjustment unit has a base and a plurality of second engagement parts. The elastic unit is disposed in the first hole and between the positioning unit and the actuation unit. When the actuation unit is actuated, the first engagement part disengages with the second engagement part to allow movement of adjustment unit. When the actuation unit is non-actuated, the elastic unit forces the first engagement part to engage with a selected second engagement part to lock the adjustment unit.

DETAILED DESCRIPTION OF THE INVENTION

Figure 1:
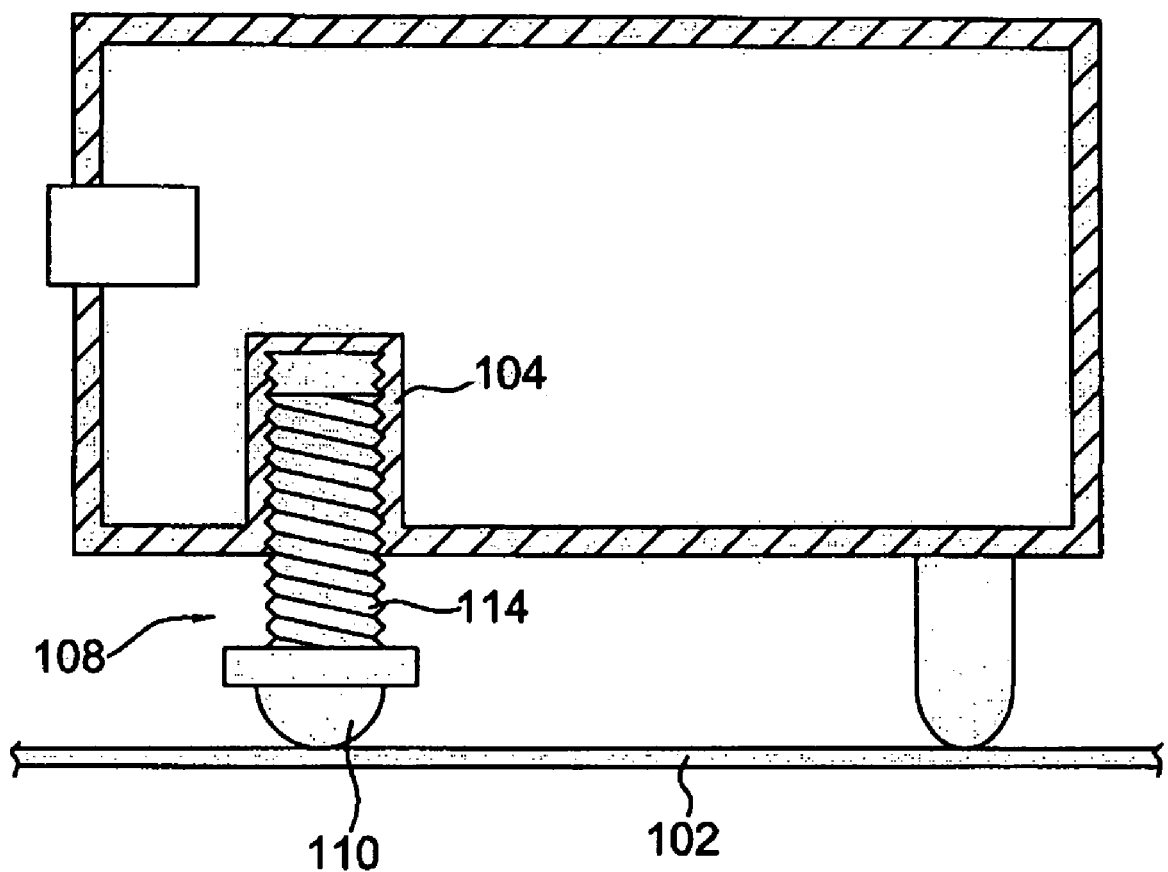
FIG. 1 is a schematic view of prior art adjustment apparatus.
Figure 2:
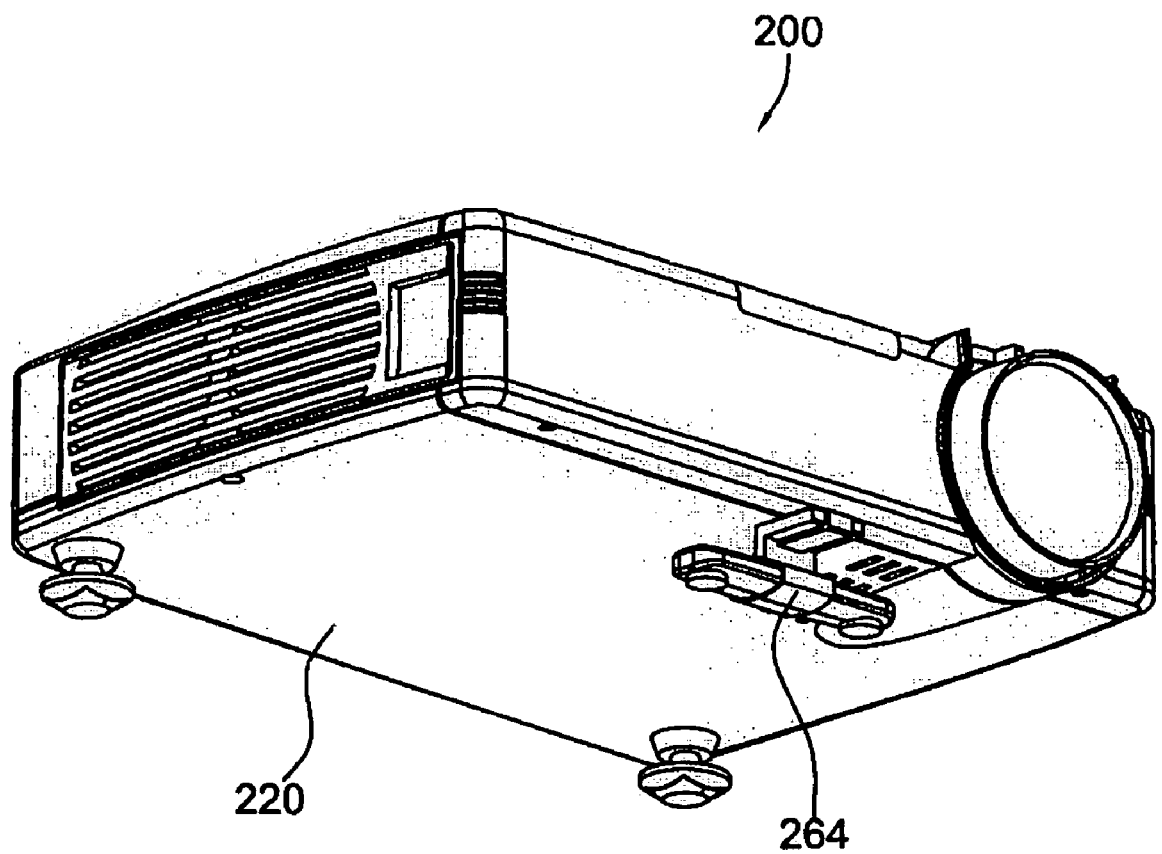
FIG. 2 is a schematic view of a projector in accordance with one embodiment of the present invention.
Figure 3:
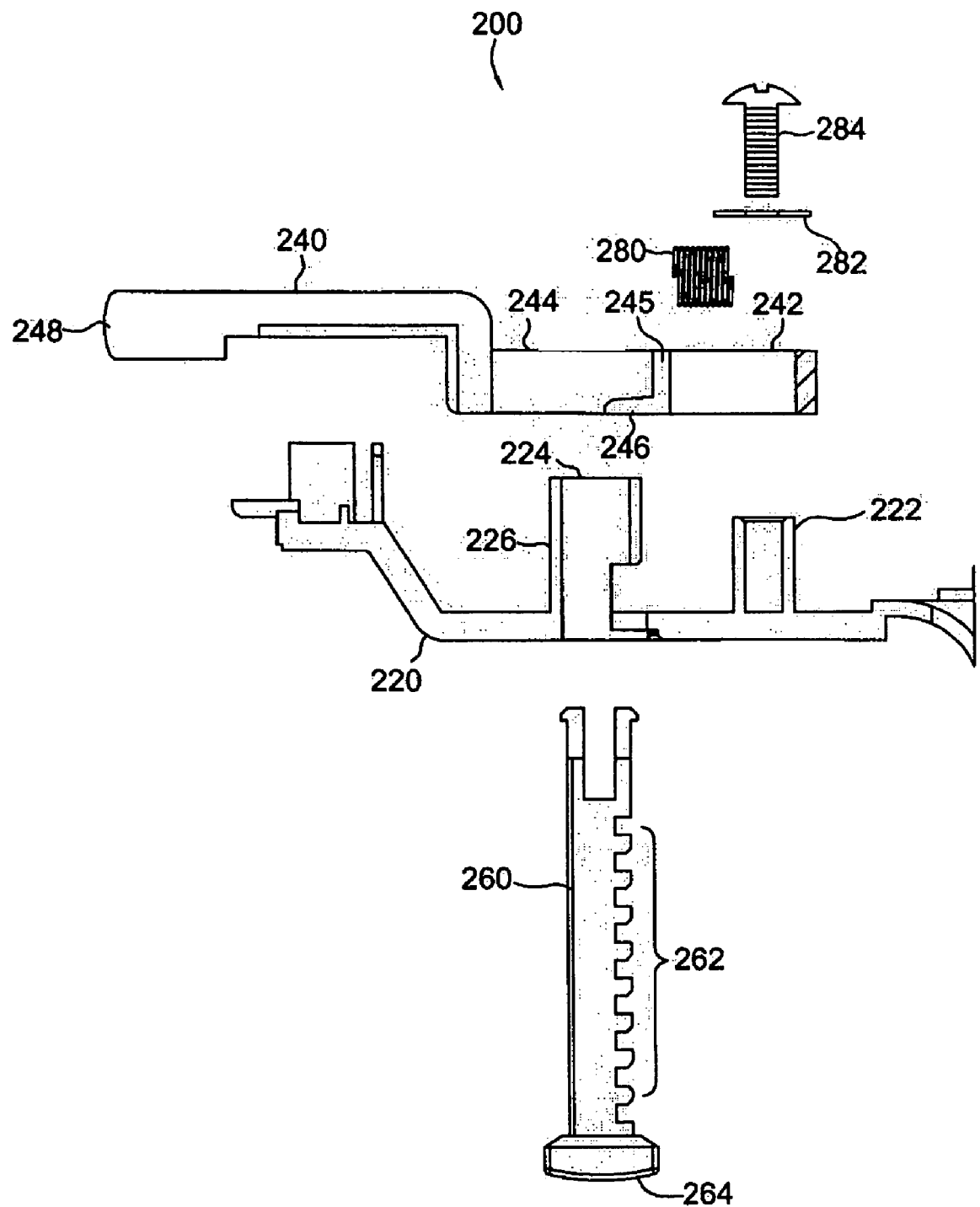
FIG. 3 is an explosive view of the height-adjustable mechanism in accordance with one embodiment of the present invention.

The present invention discloses a height-adjustable apparatus. FIG. 2 illustrates a projector 200 in accordance with one embodiment of the present invention. FIG. 3 illustrates the explosive view of the height-adjustable mechanism of the projector 200. The relationship between components in the projector 200 may be clearly understood through the following description and the drawings. The projector 200 includes a chassis 220, an actuation unit 240, an adjustment unit 260, and an elastic unit 280. The chassis 220 has a positioning unit 222, an opening 224, and a guide wall 226. It should be noted that some components of the projector 200 are not shown in the drawings for simplicity. However, those skilled in the art may understand that the projector 200 may include other components inside the chassis 220, such as a lamp, a circuit board, a power supply, etc. Further, the projector 200 may include an upper housing (not shown in the drawings) to form an assembly with the chassis 220 to accommodate the components of the projector 200.

In this embodiment, the positioning unit 222 is a column-like protrusion to confine the movement of the actuation unit 240. However, the positioning unit 222 may be a block or other similar structures. The actuation unit 240 is movably disposed on the chassis 220. The actuation unit 240 has two frames 243, a first engagement part 246, and an end part 248. The two frames 243 respectively define a first hole 242 and a second hole 244. The first hole 242 accommodates the positioning unit 222, and the second hole 243 accommodates the adjustment unit 260. In this embodiment, the first hole 242 and the second hole 244 are separated by a wall 245. The wall 245 may be created by any method, for example, the wall 245 may be formed integrally with the actuation unit 240 by injection molding, or the wall 245 may be attached to frames 243 between the first hole 242 and the second hole 244. The wall 245 blocks the elastic unit 280 and will be described in details later. The user pushes the end part 248 to actuate the actuation unit 240 from a first status to a second status. The first status and the second status will be respectively illustrated in FIG. 5 and FIG. 6. The adjustment unit 260 is movably disposed on the chassis 220 and passes through the opening 224 and the second hole 244. In addition, the adjustment unit 260 has a base 264 and a plurality of second engagement parts 262.

The first engagement part 246 is used to selectively engage with one of the plurality of second engagement parts 262. In this embodiment, the first engagement part 246 is a protruding block and the second engagement parts are a plurality of grooves. When the first engagement part 246 engages with one of the plurality of second engagement parts 262, the adjustment unit 260 is located at a position corresponding to the selected one of the plurality of second engagement parts 262. It should be noted that the first engagement part 246 and the second engagement parts 262 may be any other structures capable of engaging with each other. For example, the first engagement part 246 may be a groove and the second engagement parts 262 may be a plurality of protruding blocks, or alternatively, the first engagement part 246 may be a protruding block and the second engagement part 262 may be a rack. Other similar structures may also be used and are omitted here. The base 264 stands on the ground or a platform (not shown in the drawings) to support at least a part of weight of the projector 200. The elastic unit 280 is disposed in the first hole 242 and between the positioning unit 222 and the actuation unit 240 to provide a buffering force or a resilient force.

Figure 4:
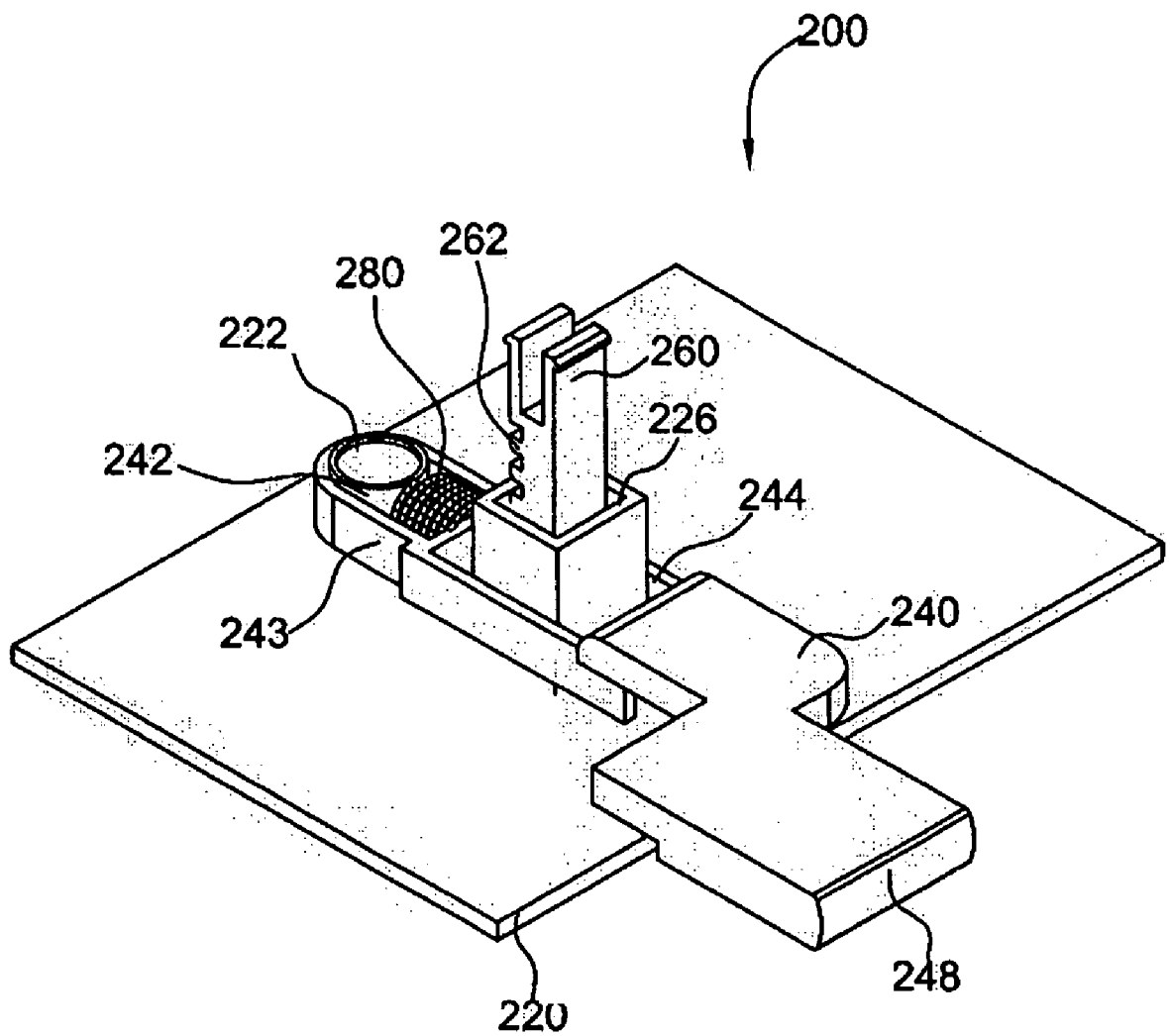
FIG. 4 is a schematic view of the height-adjustable mechanism in accordance with one embodiment of the present invention.

FIG. 4 is a schematic view of the height-adjustable mechanism of the projector 200 in accordance with one embodiment of the present invention. The guide wall 226 of chassis 220 guides a moving path of the adjustment unit 260 to prevent from mis-location. In this embodiment, the guide wall 226 is a rectangular-shaped column formed integrally with the chassis 220 by injection molding. In other embodiment, the guide wall 226 may be in other shape. Further, the guide wall 226 may be formed separately and then be attached to the chassis 220. The elastic unit 280 is disposed in the first hole 242 and between the positioning unit 222 and the wall 245 of actuation unit 240. When a user pushes the end part 248 of actuation unit 240, the actuation unit 240 moves from a first status to a second status and the elastic unit 280 provides a buffering force. When the user releases the end part 248 of actuation unit 240, the elastic unit 280 provides a resilient force to move the actuation unit 240 from the second status back to the first status. In this embodiment, the elastic unit 280 is a spring. However, it should be noted that the elastic unit 280 may be formed by other elastic materials. In this embodiment, the first hole 242 is defined by a frame 243. Thus, the frame 243 defines the location of actuation unit 240 between the first status and the second status, and the moving path of actuation unit 240 is also guided by the frame 243. The shape of frame 243 may be designed according to the available space inside the projector 200. Those skilled in the art may understand the variety designs of the frame 243, and thus omitted here.

Figure 5:
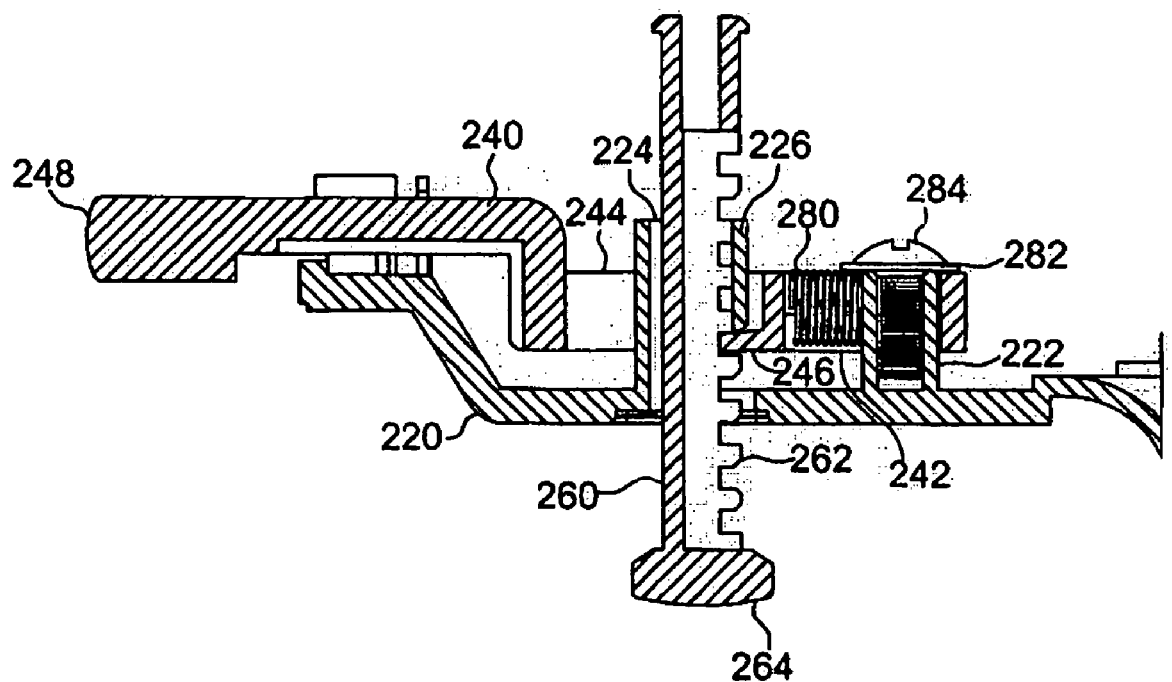
FIG. 5 is cross-sectional view of the height-adjustable mechanism at a first status in accordance with one embodiment of the present invention.
Figure 6:
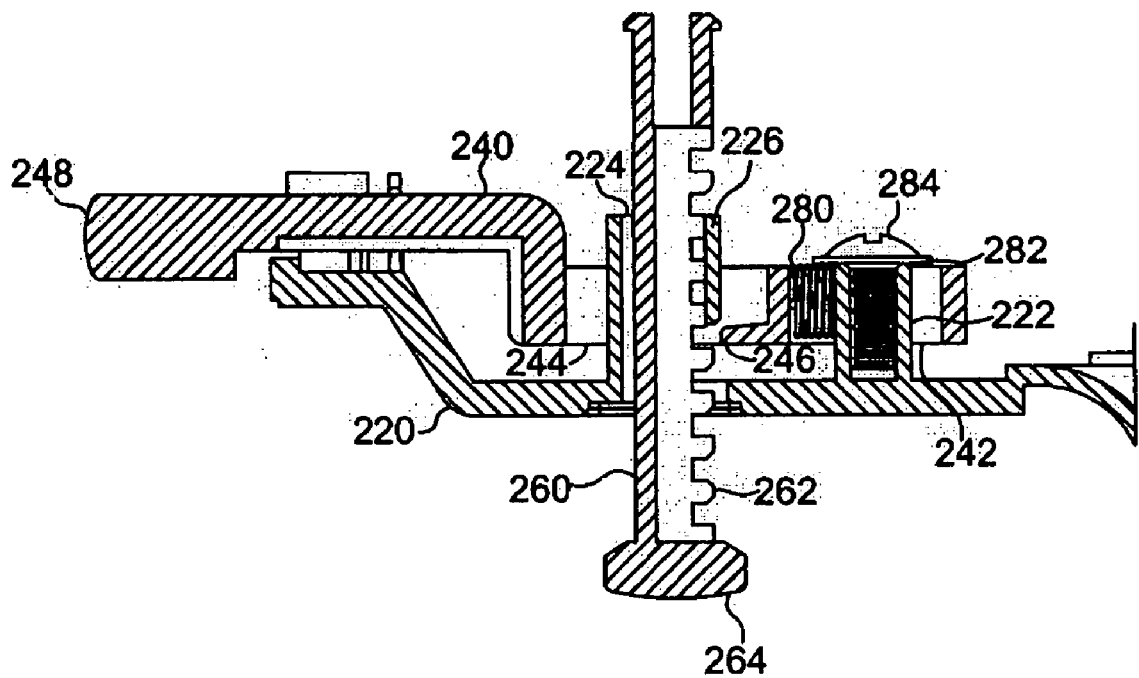
FIG. 6 is cross-sectional view of the height-adjustable mechanism at a second status in accordance with one embodiment of the present invention.

FIG. 5 is cross-sectional view of the projector 200 with the actuation unit 240 at a first status. FIG. 6 is cross-sectional view of the projector 200 with the actuation unit 240 at a second status. In FIG. 5, the actuation unit 240 engages with one of the plurality of second engagement parts 262 to lock the adjustment unit 260. By means of the engagement, the projector 200 is maintained at a predetermined height corresponding to the selected second engagement part. In FIG. 6, the actuation unit 240 moves from the first status to the second status in response to a user's action. The elastic unit 280 is compressed by the wall 245 and the positioning unit 222. The first engagement part 246 is disengaged from the second engagement part 262, and thus, the adjustment unit 260 is ready to be adjusted by the user. The user may adjust the position of the adjustment unit 260 according to the condition of surrounding environment. When the projector 200 is adjusted to a desired height, the user releases the end part 248 of actuation unit 240, and the elastic unit 280, between the positioning unit 222 and wall 245, provides a resilient force to move the actuation unit 240 from the second status back to the first status. When the actuation unit 240 moves back to the first status, the first engagement part 246 engages with one of the second engagement parts 262 corresponding to the selected height of projector 200. The adjustment unit 260 is then locked by the first engagement part 246 and second engagement part 262. By the height-adjustment mechanism described above, the user may select one of the second engagement parts 262 to engage with the first engagement part 246, and thus maintains the projector 200 at a desired height. It should be noted that the components described in the above embodiments are illustrated as exemplary purpose rather than limitations to the present invention. There are still various modifications to illustrated embodiments within the scope of the present invention. For example, the user moves the actuation unit 240 by pushing the end part 248 to compress the elastic unit 280 in the above embodiment. However, in another embodiment, the actuation unit 240 may be embodied as a pullback-type mechanism to stretch the elastic unit 280, or other similar mechanism.

Moreover, the projector 200 may further include a washer 282 and a fastening unit 284 in accordance with another embodiment of the present invention. The washer 282 is disposed on one end of the positioning unit 222 of chassis 220. The actuation unit 240 is thus confined between the washer 282 and the chassis 220. The use of washer 282 and fastening unit 284 prevents the actuation unit 240 from mis-location. The washer 282 may use suitable materials in any shape in the present invention. In this embodiment, the washer is a ring-shaped metal plate, and the fastening unit 284 is a screw.

The above description sets forth various preferred embodiments of the invention only, and is not intended to limit the scope, applicability, or configuration of the invention in any way. Rather, various changes may be made in the function and arrangement of the elements described in these embodiments without departing from the spirit and scope of the invention. Thus, the protected scope of the present invention is as set forth in the appended claims.

What is claimed is:

1. A height-adjustable apparatus, comprising:
a chassis having a positioning unit and an opening;
an actuation unit, movably disposed on the chassis, having a first hole and a first engagement part, the first hole accommodating the positioning unit;
an adjustment unit, passing through the opening and being movably disposed on the chassis, the adjustment unit having a plurality of second engagement part;
an elastic unit disposed in the first hole and between the positioning unit and the actuation unit; and
a washer, disposed on one end of the positioning unit, and the actuation unit being confined between the washer and the chassis,
wherein, when the actuation unit is actuated, the first engagement part disengages with the second engagement part to allow movement of adjustment unit, and when the actuation unit is non-actuated, the elastic unit forces the first engagement part to engage with a selected second engagement part to lock the adjustment unit.

2. The apparatus according to claim 1, wherein the actuated unit further comprises a second hole for accommodating the adjust unit.

3. The apparatus according to claim 1, further comprising a fastening unit for fastening the washer on the positioning unit.

4. The apparatus according to claim 1, wherein the first engagement part is a protrusion, and the second engagement part comprises a plurality of recessions.

5. The apparatus according to claim 1, wherein the elastic unit is a spring.

6. The apparatus according to claim 1, wherein the adjustment unit further comprises a base for supporting the apparatus.

7. The apparatus according to claim 6, wherein the selected second engagement part defines a distance between the base and the chassis.

8. The apparatus according to claim 1, wherein the chassis further comprises a guide wall disposed on the rim of opening.

9. The apparatus according to claim 1, wherein the actuation unit further comprises an end part, and wherein a user pushes the end part to actuate the actuation unit.

10. The apparatus according to claim 1, wherein the apparatus is a projector.

11. A height-adjustable apparatus, comprising:
a chassis having a column protrusion and an opening;
an adjustment unit, passing through the opening and being movably disposed on the chassis, the adjustment unit having a plurality of second engagement part and a base for supporting the apparatus;
an actuation unit, movably disposed on the chassis, having two frames and a first engagement part disposed on the wall between two frames, the two frames respectively defining a first hole and a second hole on two side of the wall, the first hole accommodating the column protrusion, and the second hole accommodating the adjustment unit; and
an elastic unit disposed in the first hole and between the column-like protrusion and the wall,
wherein, when the actuation unit is actuated, the first engagement part disengages with the second engagement part to allow movement of adjustment unit, and when the actuation unit is non-actuated, the elastic unit forces the first engagement part to engage with a selected second engagement part to lock the adjustment unit.

12. The apparatus according to claim 11, further comprising a washer disposed on one end of the column protrusion, and the actuation unit being confined between the washer and the chassis.

13. The apparatus according to claim 12, further comprising a fastening unit for fastening the washer on the column protrusion.

14. The apparatus according to claim 11, wherein the first engagement part is a protrusion, and the second engagement part comprises a plurality of recessions.

15. The apparatus according to claim 11, wherein the elastic unit is a spring.

16. The apparatus according to claim 11, wherein the selected second engagement part defines a distance between the base and the chassis.

17. The apparatus according to claim 11, wherein the chassis further comprises a guide wall disposed on the rim of opening.

18. The apparatus according to claim 11, wherein the actuation unit further comprises an end part, and wherein a user pushes the end part to actuate the actuation unit.

19. The apparatus according to claim 11, wherein the apparatus is a projector.

* * * * *